United States Patent
Levin et al.

(10) Patent No.: US 10,594,711 B2
(45) Date of Patent: Mar. 17, 2020

(54) DETECTION OF BOTNETS USING COMMAND-AND-CONTROL ACCESS PATTERNS

(71) Applicant: Microsoft Technology Licensing, LLC., Redmond, WA (US)

(72) Inventors: Roy Levin, Zichron Yaakov (IL); Royi Ronen, Tel Aviv (IL)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 397 days.

(21) Appl. No.: 15/362,076

(22) Filed: Nov. 28, 2016

(65) Prior Publication Data

US 2018/0152465 A1    May 31, 2018

(51) Int. Cl.
| | | |
|---|---|---|
| *H04L 29/06* | (2006.01) | |
| *G06F 9/455* | (2018.01) | |
| *G06N 20/00* | (2019.01) | |
| *H04L 29/08* | (2006.01) | |

(52) U.S. Cl.
CPC ...... *H04L 63/1425* (2013.01); *G06F 9/45533* (2013.01); *G06F 9/45558* (2013.01); *G06N 20/00* (2019.01); *H04L 63/1416* (2013.01); *H04L 67/10* (2013.01); *G06F 2009/45587* (2013.01); *H04L 2463/144* (2013.01)

(58) Field of Classification Search
CPC ............. H04L 63/1425; G06F 9/45533; G06F 9/45558
USPC .......................................................... 726/23
See application file for complete search history.

(56) References Cited

U.S. PATENT DOCUMENTS

| | | |
|---|---|---|
| 8,260,914 B1 | 9/2012 | Ranjan |
| 8,402,543 B1 | 3/2013 | Ranjan et al. |
| 8,433,796 B2 | 4/2013 | Wang et al. |
| 8,661,544 B2 | 2/2014 | Yen et al. |

(Continued)

OTHER PUBLICATIONS

Yadav, et al., "Detecting Algorithmically Generated Malicious Domain Names", In Proceedings of the 10th ACM SIGCOMM conference on Internet measurement, Nov. 1, 2010, pp. 48-61.

(Continued)

*Primary Examiner* — Eleni A Shiferaw
*Assistant Examiner* — Angela R Holmes
(74) *Attorney, Agent, or Firm* — M&B IP Analysts, LLC (57) ABSTRACT

A method and device for detecting botnets in a cloud-computing infrastructure are provided. The method includes gathering data feeds over a predefined detection time window to produce a detection dataset, wherein the detection dataset includes at least security events and a first set of bot-labels related to the activity of each of at least one virtual machine in the cloud-computing infrastructure during the detection time window; generating, using the detection dataset, a features vector for each of a plurality of virtual machines in the cloud-computing infrastructure, wherein the features vector is based on idiosyncratic (iSync) scores related to botnet activity; transmitting each generated features vector to a supervised machine learning decision model to generate a label indicating if each of the plurality of virtual machines is a bot based on the respective features vector; and determining each virtual machine labeled as a bot as being part of a botnet.

21 Claims, 5 Drawing Sheets

(56) References Cited

U.S. PATENT DOCUMENTS

| | | | |
|---|---|---|---|
| 8,762,298 | B1 | 6/2014 | Ranjan et al. |
| 8,904,530 | B2 | 12/2014 | Liu et al. |
| 9,143,522 | B2 | 9/2015 | Wang et al. |
| 9,191,403 | B2 | 11/2015 | Zoldi et al. |
| 9,219,744 | B2 | 12/2015 | Baliga et al. |
| 2014/0090059 | A1* | 3/2014 | Wang .................. H04L 63/1416 726/23 |
| 2015/0195299 | A1* | 7/2015 | Zoldi .................. H04L 63/1433 726/25 |

OTHER PUBLICATIONS

Butler, et al., "Quantitatively Analyzing Stealthy Communication Channels", In Proceedings of the 9th international conference on Applied cryptography and network security, Jun. 7, 2011, 18 pages.

Stevanovic, et al., "Machine Learning for Identifying Botnet Network Traffic", In Technical report of Aalborg University, Retrieved on: Aug. 25, 2016, 29 pages.

Zeidanloo, et al., "Botnet Detection by Monitoring Similar Communication Patterns", In International Journal of Computer Science and Information Security, vol. 7, No. 3, May, 2010, pp. 36-45.

Gu, et al., "BotSniffer: Detecting Botnet Command and Control Channels in Network Traffic", In Proceedings of the 15th Annual Network and Distributed System Security Symposium, Feb. 10, 2008, 19 pages.

Stalmans, et al., "A Framework for DNS Based Detection and Mitigation of Malware Infections on a Network", In Proceedings of Information Security South Africa, Aug. 15, 2011, 8 pages.

Rouse, Margaret, "botnet (zombie army)", Retrieved on: Sep. 1, 2016 Available at: http://searchsecurity.techtarget.com/definition/botnet.

"What are Bots, Botnets and Zombies?", Retrieved on: Sep. 1, 2016 Available at: https://www.webroot.com/nz/en/home/resources/tips/pc-security/security-what-are-bots-botnets-and-zombies.

Zeltser, Lenny, "When Malware Distributes Links through Social Networks", Retrieved on: Sep. 1, 2016 Available at: https://zeltser.com/malicious-links-on-social-networking-sites/.

"Kullback—Leibler divergence", Retrieved on: Sep. 1, 2016 Availabble at: https://en.wikipedia.org/wiki/Kullback%E2%80%93Leibler_divergence.

Feily, et al., "A Survey of Botnet and Botnet Detection", In Proceedings of Third International Conference on Emerging Security Information, Systems and Technologies, Jun. 18, 2009, pp. 268-273.

Thomas, Karl, "Nine Bad Botnets and the Damage They Did", Published on: Feb. 25, 2015 Available at: http://www.welivesecurity.com/2015/02/25/nine-bad-botnets-damage/.

* cited by examiner

DETECTION OF BOTNETS USING COMMAND-AND-CONTROL ACCESS PATTERNS

BACKGROUND

In recent years, the reliance on the Internet has introduced numerous challenges to the protection of the privacy, integrity and security of user data. Services, such as banking, commerce, government, education, and more are accessible through the Internet. Thus, such services are vulnerable to malicious activities. One of the most common security threats carrying out malicious activities on the Internet is malicious software, or malware. Malware can range from viruses to Trojans.

The propagation and control over malware can be achieved by means of a malware bot (also known as a bot). A bot is a computer infected with malware having the ability to communicate with an attacker through a Command and Control (CnC) server. A botnet is usually a large collection of computers that are infected with a specific malware and can communicate with the same CnC server or servers. An owner of a computer is usually not aware that the computer is a bot or part of a botnet.

Recent security reports acknowledge that botnets pose one of the main threats to the Internet, including its infrastructure and websites. Obviously, on-lines services accessible through the internet are also affected by malicious activities executed by botnets.

As attacks executed by botnets have become complex, existing security solutions are inefficient in detecting botnets. Specifically, most security solutions attempt to scan computers for the existence of malware or to detect communications between a botnet and a CnC server. The malware scan is limited to analyzing binary executable files to determine if a malware signature is contained therein. Such a scan is limited to known malware signatures. Furthermore, because there is a virtually infinite number of ways that a binary botnet file can be implemented, such a scan is very limited in what can be detected.

Any attempts to detect messages directed to CnC servers is also error-prone, as such messages are usually encoded. In addition, the location (e.g., an IP address or a domain name) of a CnC server is usually hidden or unknown. Attackers typically hide CnC servers using techniques such as fast-flux, double fast-flux, and a domain generation algorithm (DGA). For example, a fast-flux technique uses many IP addresses associated with a single fully qualified domain name and swaps the IP addresses at a high frequency. Therefore, the IP address (location) of a CnC server cannot be traced. Similarly, the fast-flux, a DGA technique, periodically generates many domain names that can be used to access CnC servers.

More complex techniques require indirect communication between a botnet and CnC servers. Such techniques use user-generated content (UGC) websites to send messages between CnC servers and botnets. The indirect communication techniques are difficult to because, when used, there is no visible IP address or domain name that is accessed, and there is no direct link that can be tracked.

Other security solutions for detection of botnets are anomaly-based. Such solutions typically implement unsupervised machine learning methods designed to detect traffic anomalies that can indicate the existence of malicious activity within the network. However, such solutions suffer from a high false-positive rate, because each detected anomaly (or deviation from classified traffic pattern) triggers an alert. As such, even legitimate alerts are often ignored.

The complexity of botnet detection is magnified when trying to identify botnets residing in a cloud-computing infrastructure. On such infrastructures, virtual machines (VMs) can be compromised to execute malware bots, thereby forming a botnet. In addition to the challenges noted above, the complexity of "cloud-based botnets" detection results from the fact that VMs can be executed or halted. Thus, their operation cannot be accurately profiled to identify anomalies. In addition, the solutions discussed above are not scalable and, thus, cannot be effectively implemented in a cloud-computing infrastructure.

It would therefore be advantageous to provide a solution that would overcome the deficiencies noted above by detecting bots and botnets operable in cloud-computing infrastructures.

SUMMARY

This Summary is provided to introduce a selection of concepts in a simplified form that are further described below in the Detailed Description. This Summary is not intended to identify key features or essential features of the claimed embodiments, nor is it intended to be used to limit the scope of the various claimed embodiments. Moreover, the sole purpose of this Summary is to present some concepts of one or more embodiments in a simplified form as a prelude to the more detailed description that is presented later. For convenience, the term "some embodiments" or "various embodiments" may be used herein to refer to a single embodiment or multiple embodiments of the disclosure.

Some embodiments disclosed herein include a method for detecting botnets in a cloud-computing infrastructure. The method comprises gathering data feeds over a predefined detection time window to produce a detection dataset, wherein the detection dataset includes at least security events and a first set of bot-labels related to the activity of each of at least one virtual machine in the cloud-computing infrastructure during the detection time window; generating, using the detection dataset, a features vector for each of a plurality of virtual machines in the cloud-computing infrastructure, wherein the features vector is based on idiosyncratic (iSync) scores related to botnet activity; transmitting each generated features vector to a supervised machine learning decision model to generate a label indicating if each of the plurality of virtual machines is a bot based on the respective features vector; and determining each virtual machine labeled as a bot as being part of a botnet.

Some embodiments disclosed herein also include a device for detecting botnets in a cloud-computing infrastructure. The device comprises a processing circuitry; and a memory, the memory containing instructions that, when executed by the processing circuitry, configure the device to: gather data feeds over a predefined detection time window to produce a detection dataset, wherein the detection dataset includes at least security events and a first set of bot-labels related to the activity of each of at least one virtual machine in the cloud-computing infrastructure during the detection time window; generate, using the detection dataset, a features vector for each virtual machine in the cloud-computing infrastructure, wherein the features vector is based on idiosyncratic (iSync) scores related to botnet activity; transmit each generated features vector to a supervised machine learning decision model to generate a label indicating if each of the plurality of virtual machines is a bot based on the respective features vector; and determine each virtual machine labeled as a bot as being part of a botnet.

Some embodiments disclosed herein also include a non-transitory computer readable medium having stored thereon instructions for causing a processing circuitry to execute a process for detecting botnets in a cloud-computing infrastructure. The process comprises gathering data feeds over a predefined detection time window to produce a detection dataset, wherein the detection dataset includes at least security events and a first set of bot-labels related to the activity of each of at least one virtual machine in the cloud-computing infrastructure during the detection time window; generating, using the detection dataset, a features vector for each virtual machine in the cloud-computing infrastructure, wherein the features vector is based on idiosyncratic (iSync) scores related to botnet activity; transmitting each generated features vector to a supervised machine learning decision model to generate a label indicating if each of the plurality of virtual machines is a bot based on the respective features vector; and determining each virtual machine labeled as a bot as being part of a botnet.

BRIEF DESCRIPTION OF THE DRAWINGS

The subject matter disclosed herein is particularly pointed out and distinctly claimed in the claims at the conclusion of the specification. The foregoing and other objects, features and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claims. Moreover, some statements may apply to some inventive features but not to others. In general, unless otherwise indicated, singular elements may be in plural and vice versa with no loss of generality. In the drawings, like numerals refer to like parts through several views.

By way of example and without limitation, a device and method for detecting botnets in cloud-computing infrastructure are provided. In an embodiment, the detection is based on a supervised machine learning decision model designed to determine whether each virtual machine (VM) acts as a bot or as part of a botnet at a given time. The decision model is trained to generate such decisions based on features related to the operation of each VM during a predefined detection time window. In an embodiment, such a time window is relatively short (e.g., not more than a day long) to account for the fact that bots frequency change their communication patterns with command-and-control (CnC) servers. The decision model is configured to operate based on a set of assumptions or verified datasets. Thus, the disclosed method and system can detect botnets operating in a frequently-changing environment where a large number of VMs (e.g., millions of VMs) are concurrently monitored.

Figure 1:
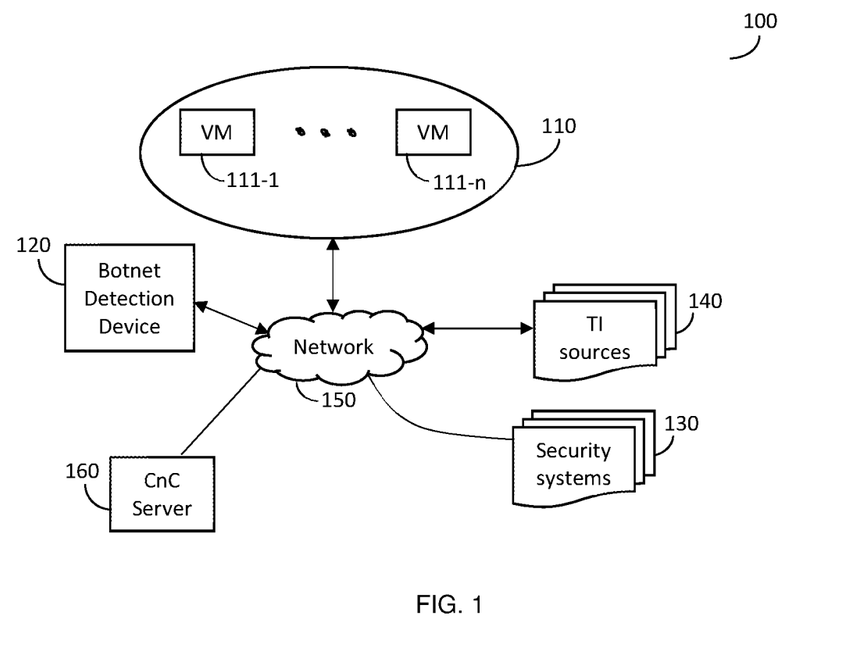
FIG. 1 is a network diagram utilized to describe the various embodiments for detection of botnets in cloud-computing infrastructures.

FIG. 1 is an example network diagram 100 utilized to describe the various embodiments for detection of bots and botnets in cloud-computing infrastructures. As depicted in FIG. 1, a cloud-computing infrastructure ("cloud") 110, a botnet detection device 120, a plurality of security systems 130 (collectively labeled as 130), and a plurality of threat intelligence (TI) sources 140 (collectively labeled as 140) are communicably connected to a network 150.

The cloud-computing infrastructure 110 hosts a plurality of virtual machines (VMs) 111-1 through 111-n (collectively referred to hereinafter as VMs 111 or individually as a VM 111, merely for simplicity purposes). A VM 111 may be infected by malware and act as a bot. Two or more infected VMs 111 may form a botnet communicating with a CnC server 160. The cloud-computing infrastructure may be realized as, for example, Amazon® Web Services (AWS), Cisco® Metapod, Microsoft® Azure®, Google® Compute Engine (GCE), Joyent®, and the like. The network 150 may be the Internet, the world-wide-web (WWW), a local area network (LAN), a wide area network (WAN), a metro area network (MAN), and other networks.

According to the disclosed embodiments, the botnet detection device 120 is configured to detect which of the VMs 111 is a bot, part of a botnet communicating with the CnC server 160, or both. It should be noted that an Internet protocol (IP address), a domain name, or both an IP address and a domain name of the CnC server 160 is unknown and typically obscured using the techniques noted above. The detection is based, in part, on data feeds frequently received from security systems 130 and the TI sources 140. Data feeds collectively refer to security events received from the security systems 130 and threat information (e.g., any VM 111 identified as a bot) received from the TI sources 140. Examples for security events and threat information that may be included in a data feed are provided below.

The detection device 120 is configured to process the data feeds to create and train a supervised machine learning decision model. The detection device 120 is further configured to utilize the data feeds and the decision model to determine if each of the VMs 111 is a bot. In some embodiments, any VM 111 determined to be a bot may be reported back to the security systems 130, to the TI sources 140, or to both. Such a report may include, for example, an identifier of a VM, a detection time, IP addresses and domain names accessed by the infected VM, and so on. The operation of the botnet detection device 120 is described in greater detail herein below.

The botnet detection device 120 can be realized as a physical machine, a virtual machine, or a combination thereof. The detection device 120 may be deployed in the cloud-computing infrastructure 110, in a datacenter (not shown), as an on-premises device, or in a combination thereof. In some configurations, the botnet detection device 120 may be implemented as a distributed device (or system) to perform parallel processing of certain tasks. An example structure of the botnet detection device 120 is provided in FIG. 5.

A security system 130 is configured to collect security events generated by the VMs 111. Such security events may not necessarily indicate a threat, but may rather indicate the activity performed by the VM. A security event designates at least the VM that issued the event and at least one entity causing the event. The security event may also include metadata indicating information such as, but not limited to, a VM ID, an event ID, an event type, an entity, an entity value, time and date, and so on. The entity causing a security event may be indicated using, for example, a domain name, a destination IP address, a process name, a DLL name, and the like. For example, when a VM 111 sends a request to a domain name xyx.com, such a request would trigger a security event. The security event designates the domain name 'xyx.com' as an entity. Examples for a security system 130 may include a security information and event management (SIEM) system, a security event management (SEM) system, an event repository, and the like. The data feeds received by the detection device 120 include security events gathered and reported by the security system 130. The following table, Table 1, provides examples for security events that may be included in a data feed:

TABLE 1

| VM ID | Event ID | Timestamp | Event Type | Entity Value | Entity Value |
|---|---|---|---|---|---|
| 48dc | 1980ce43 | 20160101 22:00 | remote access | Dest IP | 192.168.3.3 |
| 490b | 1c798262 | 20160101 22:05 | remote access | Dest IP | 192.168.100.200 |
| 45cc | bc66360d | 20160101 22:02 | remote access | Dest IP | 192.168.70.50 |
| 5d8c | bc66270d | 20160527 11:02 | remote access | Domain name | itoito.ru |
| 63he | aa366360d | 20160527 11:03 | remote access | Domain name | www.gdzjco.com |

A TI source 140 provides threat information indicating at least if the cloud-computing infrastructure 110 includes a bot. That is, which of the VM 111 identified as a bot. This type of information is referred to hereinafter as labels. The TI sources 140 may be any security product that can detect vulnerabilities that may indicate bot activity (e.g., a virus scanner). A TI source 140 may be a system or a platform that aggregates reports from multiple security products and provides unified threat information (or labels). An example for such a platform is Interflow by Microsoft®. As noted above, data feeds received by the detection device 120 include threat information gathered and reported by the TI sources 140. The following table, Table 2, provides a few examples for threat information that may be included in a data feed:

TABLE 2

| VM ID | threat ID | Start time | End time | Threat Type |
|---|---|---|---|---|
| 12dc | 1974ce43 | 20160101 | 20160101 | Botnet |
| 110b | 1c791985 | 20160201 | 20160203 | |
| 45cc | bc66360d | 20160305 | 20160306 | |
| 5d8c | cb66360d | 20160527 | 20160528 | Botnet |

It should be noted that a data feed can be compiled to include the data in Tables 1 and 2. It should be emphasized that the labels indicate the TI sources 140 that are related to VMs verified as bots. Typically, the labeled VMs are only a limited set of the VMs 111. The botnet detection device 120 attempts to detect VMs 111 that currently are not labeled as VMs, but operate as such. That is, the detection device 120 is configured to predict which VMs 111 can later be detected as bots by the security products. Therefore, the botnet detection device 120, using the techniques disclosed herein, can provide an early defense against botnets in the cloud-computing infrastructure 110.

The labels utilized for the detection can be classified as "past-labels" and "future-labels" associated with past features and future features, respectively. Specifically, the botnet detection device 120 is configured to create and train a supervised machine learning model using features as well as past-labels and future-labels. The features are generated by processing the security events. The generated model is fed to a classifier.

To detect botnets, the botnet detection device 120 is configured generate features based on newly received security events. The features are related to the operation of each VM during a detection time window. As noted above, such a time window may be relatively short (e.g., 24 hours). The botnet detection device 120 is configured to transmit the generated features to a classifier, which outputs labels indicating if each VM 111 is a bot or not. The supervised machine learning implemented by the botnet detection device 120 is further discussed herein below with respect to FIG. 2.

It should be noted that the supervised machine learning decision model generated by the device 120 can predict or determine which VMs 111 are currently infected based on the features demonstrating similar behavior to that of VMs labeled as bots. For example, if the VM 111-1 is labeled as a bot communicating with the CnC server 160, and features daily generated for VMs 111-2 and 111-n are similar to features observed for the VM 111-1, then the VMs 111-2 and 111-n likely communicate with the CnC server 160. Thus, the VMs 111-2 and 111-n will also be classified or labeled as bots.

It should be further noted that the embodiments disclosed herein are not limited to the specific architecture illustrated in FIG. 1 and other architectures may be equally used without departing from the scope of the disclosed embodiments. Specifically, in a typical arrangement, a plurality of CnC servers 160 may be active and control different groups of VMs 111.

Figure 2:
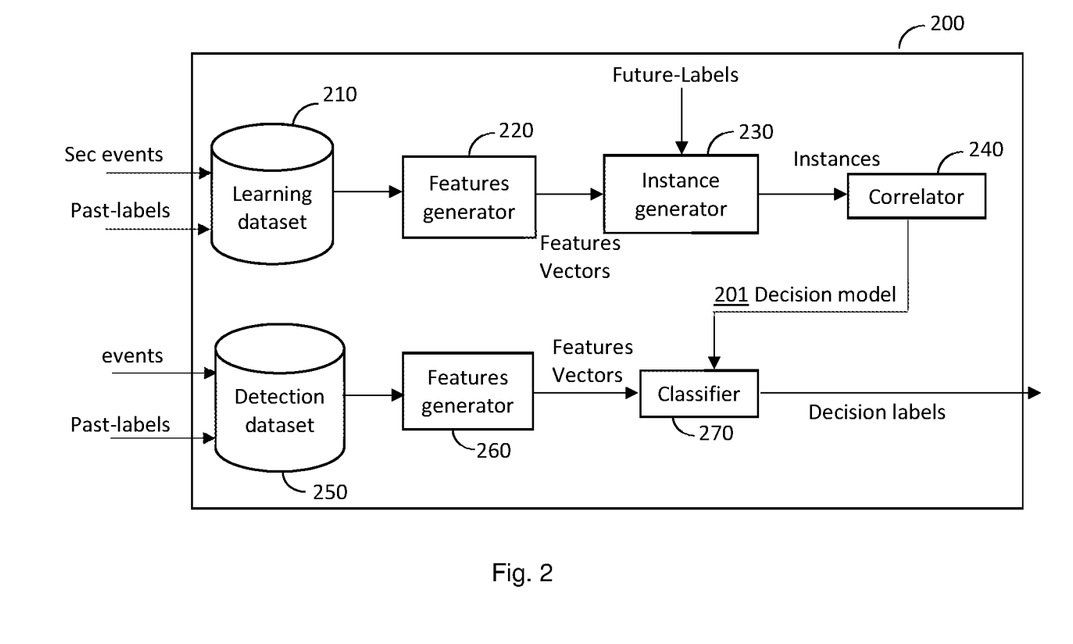
FIG. 2 is a diagram of a supervised machine learning framework utilized to detect bots and botnets according to an embodiment.

FIG. 2 is a schematic diagram of a supervised machine learning framework 200 utilized to detect and predict the existence of bots and botnets in the cloud-computing infrastructure 110 according an embodiment. For the sake of simplicity and without limitation on the disclosed embodiments, FIG. 2 will be discussed also with reference to the elements shown in FIG. 1.

The supervised machine learning framework 200 operates in two phases: learning and detection. In the learning phase, a decision model 201 is generated and trained, while in the detection phase, the decision model 201 is utilized for detection or prediction of the existence botnets in the cloud-computing infrastructure. In each phase, different datasets and processes are utilized.

Specifically, in the learning phase, security events and labels received from the systems 130 and TI sources 140 are aggregated and saved as a learning dataset 210. The labels in the dataset 210 are past-labels indicating which of the VMs (e.g., the VMs 111, FIG. 1) were labeled as a bot. The aggregation of events is for a predefined time window (e.g., all events issued during a 24 hour-time window). The security events may be of different types based on the entities designated therein. For example, security events indicating access to a domain name are of a first type and security events indicating access to an IP address are of a second type.

The learning dataset 210 is input to the features generator 220. The features generator 220 is configured to generate a features vector for each VM 111. A features vector is based on a set of features representing the activity of each VM 111 during the predefined time window. Such activity is derived from the security events saved in the learning dataset 210.

In an embodiment, to generate a features vector, first a reputation table is computed for each security event type. The reputation table includes, per event's entity, an idiosyncratic (iSync) score indicating the probability that the respective entity is related to a bot. In an embodiment, the iSync score is computed as follows:

$$iSync(x) = p(x) * \ln\left[\frac{p(x)}{q(x)}\right];$$ Eq. 1 where, 'x' is a specific entity of a certain security event type, q(x) is a probability distribution of an entity (x) across all of the VMs 111, and p(x) is a probability distribution of an entity (x) across all of the VMs 111 labeled as bots in the past-labels. In an embodiment, q(x) can be computed as the ratio between all of the VMs that accessed the entity (x) and all of the VMs in the cloud-computing infrastructure. In a similar fashion, p(x) can be computed as the ratio between all of the VMs labeled as bots that accessed the entity (x) and all of the VMs in the cloud-computing infrastructure labeled as bots. In an example embodiment, iSync(x) may range from 0 to 1, where 0 represents probability that no bot activity related to the entity (x) and 1 represents probability that bot activity related to the entity (x).

For example, if the security event type is a domain name access and a security event is generated for each VM that accessed a domain name "xyz.com," the entity is a domain name xyz.com. Thus, the iSync score is computed for the domain name xyz.com. It should be noted that the iSync score is computed for each entity (e.g., a domain name) designated in the security events. For example, iSync scores are distinctly computed for entities (domain names) "xyz.com" and "abc.com", of a domain-access security event type. A reputation table includes all iSync scores computed for all entities of a specific security event type. Thus, a plurality of reputation tables can be computed, each of which is for a different security event type.

It should be noted that the iSync score equals 0 when p(x)=q(x), thereby indicating that an entity (x) is not unique to the bot activity (e.g., all VMs are either not labeled as bots or have not accessed a valid domain name). In an embodiment, if no VM is labeled as a bot or no VM labeled as a bot has accessed an entity (x), the iSync score is set to a default score of 0.

Table 1 shows an example reputation table of iSync scores with respect to domain-access security event type. The iSync score is computed for the domains (entities), d1, . . . , ds.

TABLE 1

| | Domain name | | | | |
|---|---|---|---|---|---|
| | $d_1$ | $d_2$ | $d_3$ | $d_4$ | ... | $d_s$ |
| iSync | 1 | 0.91 | 0.002 | 0.1 | ... | 0 |

In the example Table 1, $d_1$ and $d_2$ are likely domain names of a CnC server(s), while $d_3$ $d_4$, and $d_5$ are likely popular domain names (e.g., google.com; msn.com) that are not controlled by a CnC server and, thus, are not related to bot activity.

Based on the reputation tables, a features vector is generated for each VM 111. The features vectors include a global-iSync value for each security event type. A features vector can be represented as follows:

$$F(VM_i) = <G\_iSync(SE_1), G\_iSync(SE_2), \ldots, G\_iSync(SE_w)>$$

Where, F(VMi) is the features vector of a specific VMi (i=1, . . . , n), and G-iSync($SE_i$) is the global-iSync value computed for each security event type $SE_1$ (i=1, . . . , w). As noted above, a security event type may include accessing a domain name, accessing an IP address, executing a process by the VM, executing a process by the DLL file, and so on.

In an embodiment, the global-iSync value is the sum of iSync scores computed for specific entities accessed (or executed) by a $VM_i$. That is, a global-iSync value (G_iSync($SE_i$)) can be computed as follows:

$$G\_iSync(SE_i) = \Sigma_y iSync(y);$$ Eq. 2

The iSync(y) is the iSync score computed for an entity (y) accessed by a VM, where entities (y) belong to security event types $SE_i$. For example, referring to Table 1, if a $VM_1$ is accessed only by domain names $d_1$ and $d_3$, G_iSync (Doman Access) is (1+0.0002=1.0002). If a $VM_2$ accessed only domain names $d_1$, $d_2$, and $d_3$, the G_iSync(Doman Access) for VM2 is (1+0.91+0.0002)=1.9102. The same calculation applies to each event type and each VM in the cloud-computing infrastructure. It should be noted that the learning data set includes data aggregated or gathered for a predefined time window and, thus, the features vector represents the activity of a VM during that predefined time window.

An instance generator 230 is configured to produce an instance for each VM 111 by labeling the respective features vector with future-labels. The future-labels are also received from TI sources 140 and indicate which of the VMs 111 are classified or labeled as bots. The future-labels refer to labels generated at a time later than the past-labels (i.e., the past-labels included in the learning dataset 210) were issued. Therefore, each instance is a pair including a features vector and a label (either indicating bot or not) at a given time. The features vector represents an input to a classifier (e.g., the classifier 270) and the label is a desired output value of the classifier. The instances of all VMs (e.g., the VM 111) in the cloud-computing infrastructure are fed to the correlator 240.

In an embodiment, the correlator 240 implements a supervised machine learning algorithm for analyzing instances and generating a decision model (or an inferred function). Examples for the supervised machine learning algorithm includes, Logistic Regression, Naïve Bayes, SVM, Gradient Boosted Decision Trees, and the like. The decision model, generated by the correlator 240, is used to map or correlate unseen features vectors to labels indicating if the VMs are bots. The unseen vectors are analyzed during the detection phase.

Specifically, during the detection phase, security events and labels received from the security systems 130 and TI sources 140 (FIG. 1) are aggregated and saved as a detection dataset 250. The aggregation is performed over a predefined detection time window, e.g., a day. It should be emphasized that labels in the dataset 250 are neither past-labels nor future-labels used during the learning phase. The labels in the dataset 250 indicate which of the VMs 111 is currently labeled as a bot.

The detection dataset 250 is input to the features generator 260. The features generator 260 is configured to generate a features vector for each VM 111. A features vector is based on a set of features representing the activity of each VM during the predefined time window. Such activity is derived from the security events in the detection dataset 250. The generation of features vectors is further discussed above.

The generated features vectors are fed to the classifier 270. The classifier 270 is configured to output a decision labeling each VM as either a bot or not a bot. The labeling is based on the decision model 201 and the features vector of the respective VM 111. The classifier 270 can be implemented using known classifying techniques utilized in the supervised machine learning. For example, the classifier 270 can be implemented as a boosted tree, a random forest, and the like of other decision or classification trees.

It should be appreciated that the decision model 201 and the classifier 270 are not affected by dynamically changing domain names or IP addresses that can be used for botnets. This is because the decision model 201 and the classifier 270 are not trained based on learning of specific domain names, IP addresses, or both, but rather on iSync scores representing the probability for malware bot activity by each VM. Thus, the disclosed embodiments, when implemented by a detection device, can accurately detect botnets in the cloud-computing infrastructure.

In an example embodiment, any of the features generators 220 and 260, the instance generator 230, the correlator 240, and the classifier 270 can be realized by one or more hardware logic components, circuits, or both. For example, and without limitation, illustrative types of hardware logic components that can be used include Field Programmable Gate Arrays (FPGAs), Application-specific Integrated Circuits (ASICs), Application-specific Standard Products (AS-SPs), System-on-a-chip systems (SOCs), Complex Programmable Logic Devices (CPLDs), general-purpose microprocessors, microcontrollers, digital signal processors (DSPs), and the like, or any other hardware logic components that can perform calculations or other manipulations of information.

The datasets 210 and 250 can be stored in a memory, which can be volatile (e.g., RAM, etc.) memory, non-volatile (e.g., ROM, flash memory, etc.) memory, or a combination thereof. Alternatively or collectively, the datasets 210 and 250 can be stored in a storage, such as a magnetic storage, optical storage, and the like and may be realized, for example, as flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information.

Figure 3:
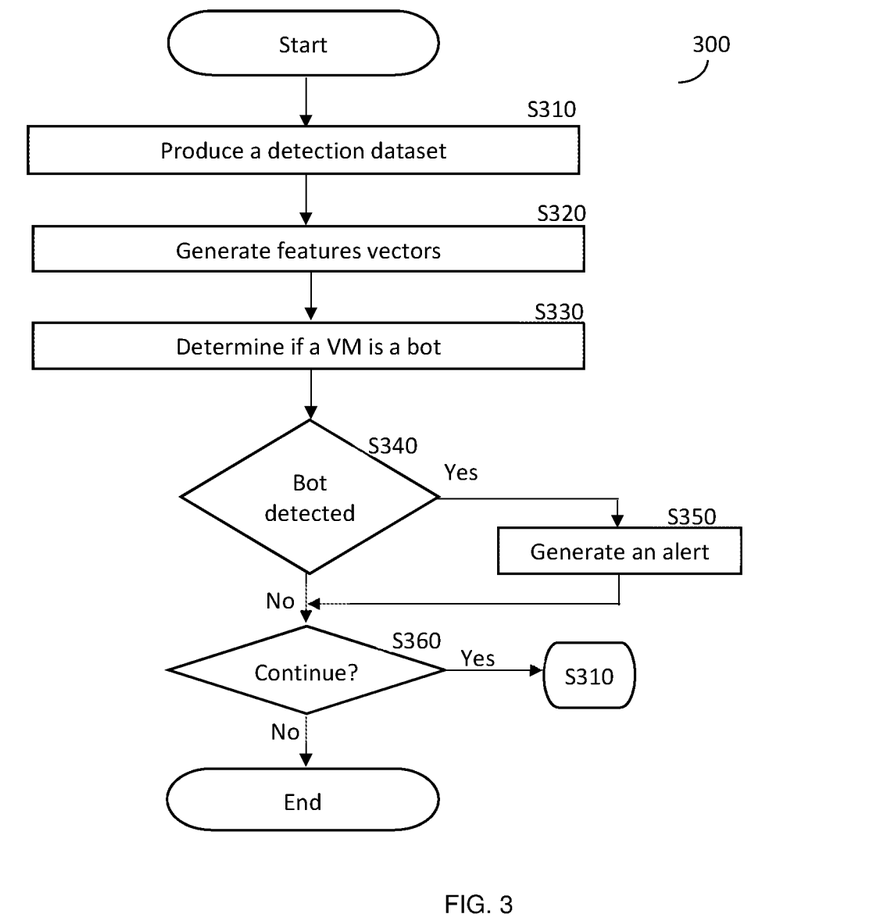
FIG. 3 is a flowchart illustrating a method for detecting botnets in cloud-computing infrastructures according to an embodiment.

FIG. 3 is an example flowchart 300 illustrating a method for detecting botnets in a cloud-computing infrastructure according to one embodiment.

At S310, data feeds received from external sources are gathered over a predefined detection time window to produce a detection dataset. A data feed includes security events and threat information received from external source. The external sources include one or more security systems (e.g., the systems 130, FIG. 1) that provide security events issued or triggered by any VM in the cloud-computing infrastructure. The external sources also include one or more threat intelligence sources (e.g., the sources 140, FIG. 1) that provide labeling information as which of the VMs in the cloud-computing infrastructure is a bot. It should be noted that a new detection dataset is gathered for each detection time window. For example, if the detection time window is a day, then a daily detection dataset is produced.

At S320, using the detection dataset, a features vector is generated for each VM in the cloud-computing infrastructure. A features vector includes a global-iSync value for each security event type. The global-iSync value is generated based on the security events in the detection dataset. The global-iSync value provides an indication of whether the respective VM currently acts as a bot, is part of botnet, or both.

Specifically, in an embodiment, S320 includes computing a reputation table for each security event type. Each reputation table includes an iSync score for each entity designated in the security events. The iSync score is the probability that the respective entity (e.g., an IP address) is related to a bot activity. In an embodiment, the iSync Score is computed using equation 1 (Eq. 1).

For each security event type, the iSync scores entities accessed by the respective VM are summed to compute a global-iSync value. In an embodiment, a global-iSync value for each security event type is computed using equation 2 (Eq. 2). The global-iSync values for the different event types (G_iSync(SE$_1$)) computed for the corresponding VM are arranged in a data structured to create the features vector. A features vector for a VM$_i$ can be presented, as described further herein above, as follows:

$$F(VM_i) = <G\_iSync(SE_1), G\_iSync(SE_2), \ldots, G\_iSync(SE_w)>$$

At S330, the features vectors generated for the VMs are transmitted to a classifier to determine if each of the VMs is a bot. The classifier implements a decision model trained to identify correlations between features vectors and labels indicating bot activity. The method for generating and training the decision model is further discussed herein below with respect to FIG. 4.

The output of S330 is, for each VM in the cloud-computing infrastructure, a label indicating if the VM acts as a bot or not during the detection time window. In a further embodiment, the label may indicate if the VM is part of a botnet. At S340, it is checked if at least one VM is detected as bot (or part of a botnet); if so, at S350, an alert is generated indicating the existence of a VM bot and execution continues with S360. The alert may include the detection time and ID (or any network identifier) of each VM detected as a bot. Otherwise, at S360, it is checked if the operation of the detection should continue and, if so, execution returns to S310, where a detection dataset is gathered for a new detection time window; otherwise, execution ends.

Figure 4:
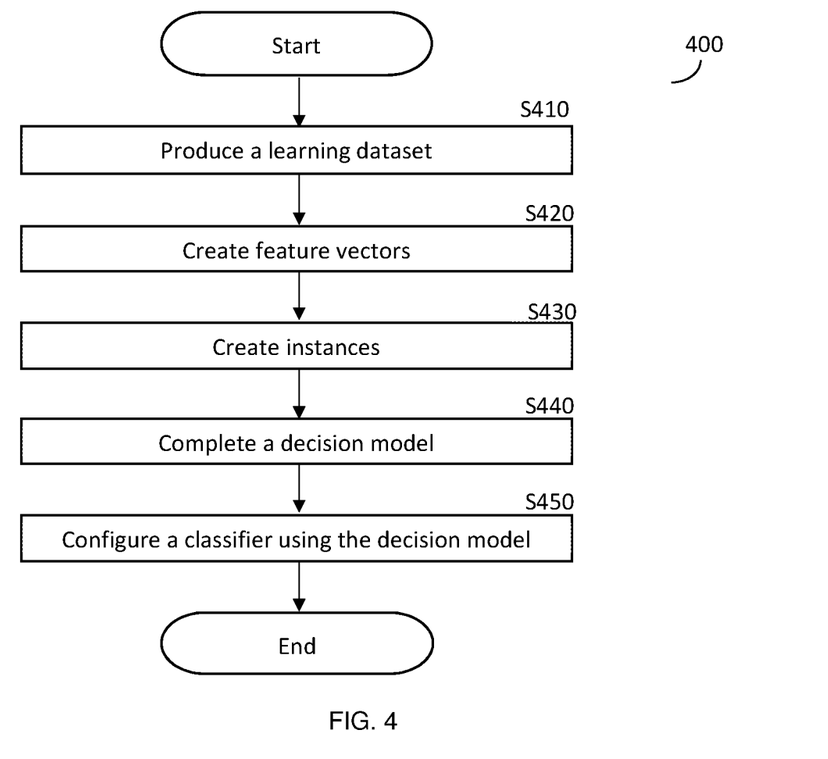
FIG. 4 is a flowchart illustrating a method for creating and training a decision model according to an embodiment.

FIG. 4 is an example flowchart 400 illustrating a method for creating and training a decision model utilized for detecting botnets in the cloud-computing infrastructure according to an embodiment. At S410, data feeds received from external data sources are gathered over a predefined learning time period to produce a learning dataset. As noted above, a data feed includes security events and threat information received from external source. The external sources include one or more security systems (e.g., the systems 130, FIG. 1) that provide security events issued or triggered by any VM in the cloud-computing infrastructure. The external sources also include one or more threat intelligence sources (e.g., the sources 140, FIG. 1) that provide labeling information indicating which of the VM in the cloud-computing infrastructure were detected as bots. The labels included in the learning datasets are referred to herein as "past-labels." Typically, the learning time period is longer than the detection time window.

At S420, using the learning dataset, a features vector is generated for each VM in the cloud-computing infrastructure. As noted above, a features vector includes a global-iSync value for each security event type. The process for generating the features vectors are discussed in greater detail above.

At S430, for each VM in the cloud-computing infrastructure, an instance is created by labeling the respective features vectors with future-labels. An instance is a pair including, for each VM, a features vector and a future-label. The future-labels are also received from one or more TI sources, but are not include in the learning dataset. The further-labels are issued after the past-labels. However, it should be noted that each future-label also indicates if a VM is classified as a bot or not.

At S440, a decision model for determining a general correlation between values of features vectors and label is computed. In an embodiment, the decision model is computed using a supervised machine learning algorithm.

At S450, a classifier utilized in the detection phase is configured with the decision model.

Figure 5:
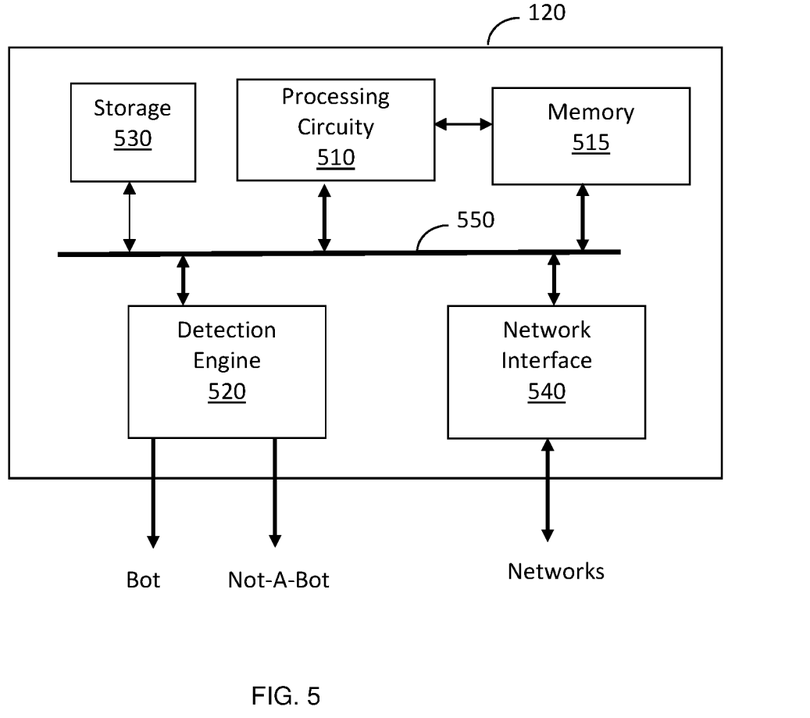
FIG. 5 is a block diagram of a botnet detection device constructed according to an embodiment.

FIG. 5 shows an example block diagram of the botnet detection device 120 constructed according to an embodiment. The botnet detection device 120 may be deployed in a cloud-computing infrastructure, in data centers, or as a stand-alone network device. The botnet detection device 120 is configured to at least detect VMs acting as bots deployed in a cloud-computing infrastructure according to the embodiments described in greater detail herein above. The botnet detection device 120 includes a processing circuitry 510 coupled to a memory 515, a query processor 520, a storage 530, and a network interface 540. In an embodiment, the components of the botnet detection device 120 are coupled or connected to a communication bus 550.

The processing circuitry 510 may be realized by one or more hardware logic components and circuits. For example, and without limitation, illustrative types of hardware logic components that can be used include FPGAs, ASICs, ASSPs, SOCs, CPLDs, general-purpose microprocessors, microcontrollers, DSPs, and the like, or any other hardware logic components that can perform calculations or other manipulations of information. The memory 515 may be volatile (e.g., RAM, etc.), non-volatile (e.g., ROM, flash memory, etc.), or a combination thereof.

The storage 530 may be magnetic storage, optical storage, and the like and may be realized, for example, as flash memory or other memory technology, CD-ROM, DVDs or other optical storage, magnetic cassettes, magnetic tape, magnetic disk storage or other magnetic storage devices, or any other medium which can be used to store the desired information.

In one configuration, computer readable instructions to implement one or more embodiments disclosed herein may be stored in the storage 530. The storage 530 may also store other computer readable instructions to implement an operating system, an application program, and the like. Computer readable instructions may be loaded in the memory 515 for execution by the processing circuitry 510. The storage 530 is configured to store, for example, access policies, client certificates, authentication tokens, device postures of client devices, device histories, user account histories, and other information that can be for authentication.

In another embodiment, the storage 530, the memory 515, or both are configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing circuitry 510 to perform the various functions described herein.

The network interface 540 allows the botnet detection device 120 to communicate with other external sources. For example, the interface 540 is configured to allow the botnet detection device 120 to communicate with TI sources (e.g., the TI sources 140), the cloud-computing infrastructure, and security systems (e.g., the systems 130).

In an embodiment, the network interface 540 allows remote access to the botnet detection device 120 for the purpose of, for example, configuration, reporting, and the like. Such a connection, in an embodiment, can be realized through a web portal. The network interface 540 may include a wired connection or a wireless connection. The network interface 540 may transmit communication media, receive communication media, or both. For example, the network interface 540 may include a modem, a network interface card (NIC), an integrated network interface, a radio frequency transmitter/receiver, an infrared port, a USB connection, and the like.

The detection engine 520 is configured to create and train a supervised machine learning decision model. The detection engine 520 is further configured to utilize the decision model to detect bots in the cloud-computing infrastructure based on data feeds received from external sources. The processes performed by the detection engine are discussed in greater detail herein above.

In an embodiment, the detection engine 520 can be realized by one or more hardware logic components and circuits. For example, and without limitation, illustrative types of hardware logic components that can be used include FPGAs, ASICs, ASSPs, SOCs, CPLDs, general-purpose microprocessors, DSPs, and the like, or any other hardware logic components that can perform calculations or other manipulations of information.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiments and the concepts contributed by the inventor to furthering the art, and are to be construed as being without limitation to such specifically recited examples and conditions. Moreover, all statements herein reciting principles, aspects, and embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for detecting botnets in a cloud-computing infrastructure, comprising:
    gathering data feeds over a predefined detection time window to produce a detection dataset, wherein the detection dataset includes at least security events and a first set of bot-labels related to the activity of each of at least one virtual machine in the cloud-computing infrastructure during the detection time window;
    generating, using the detection dataset, a features vector for each of a plurality of virtual machines in the cloud-computing infrastructure, wherein the features vector is based on idiosyncratic (iSync) scores related to botnet activity;
    computing a reputation table for each security event type of the security events contained in the detection dataset, wherein each reputation table includes an iSync score computed for each entity designated in the security events belonging to the respective security event type;
    transmitting each generated features vector to a supervised machine learning decision model to generate a label indicating if each of the plurality of virtual machines is a bot based on the respective features vector; and
    determining each virtual machine labeled as a bot as being part of a botnet.

2. The method of claim 1, further comprising:
    computing the supervised machine learning decision model.

3. The method of claim 2, further comprising:
    gathering data feeds over a predefined learning time period to produce a leaning dataset, wherein the learning dataset includes at least security events and a second set of bot-labels related to the activity of each virtual machine in the cloud-computing infrastructure during the learning time period;
    generating, using the learning data set, a features vector for each virtual machine in the cloud-computing infrastructure;
    creating, for each virtual machine, an instance using the respective generated features vector and a third set of bot-labels; and
    computing the supervised machine learning algorithm using the created at least one instance.

4. The method of claim 3, wherein the third set of bot-labels indicates bot activity occurring after issuance of the second set of bot-labels, wherein the first set of bot-labels indicate bot activity occurring after issuance of the third set of bot-labels.

5. The method of claim 1, wherein generating the features vector for each virtual machine further comprises:
    computing a global-iSync value for each security event type based on the reputation table computed for the security event type; and
    generating a features vector for the virtual machine, wherein the generated features vector includes the computed global-iSync values.

6. The method of claim 5, wherein each iSync score is a probability that a security event entity is related to bot activity.

7. The method of claim 6, wherein each iSync score is a function of the first set of bot-labels.

8. The method of claim 6, wherein computing the global-iSync value for a virtual machine for a security event type further comprises:
    summing all iSync scores computed for all security event entities that belong to the security event type and were accessed by the virtual machine.

9. The method of claim 3, wherein each of the first set of bot-labels, the second set of bot-labels, and the third set of bot-labels is received from a plurality of threat intelligence sources.

10. The method of claim 1, further comprising:
    generating an alert upon determination that a virtual machine is part of a botnet.

11. A non-transitory computer readable medium having stored thereon instructions for causing a processing circuitry to execute a process for detecting botnets in a cloud-computing infrastructure, the process comprising:
    gathering data feeds over a predefined detection time window to produce a detection dataset, wherein the detection dataset includes at least security events and a first set of bot-labels related to the activity of each of at least one virtual machine in the cloud-computing infrastructure during the detection time window;
    generating, using the detection dataset, a features vector for each virtual machine in the cloud-computing infrastructure, wherein the features vector is based on idiosyncratic (iSync) scores related to botnet activity;
    computing a reputation table for each security event type of the security events contained in the detection dataset, wherein each of the iSync scores is computed for each entity designated in the security events belonging to the security event type;
    transmitting each generated features vector to a supervised machine learning decision model to generate a label indicating if each of the plurality of virtual machines is a bot based on the respective features vector; and
    determining each virtual machine labeled as a bot as being part of a botnet.

12. A device for detecting botnets in a cloud-computing infrastructure, comprising:
    a processing circuitry; and
    a memory, the memory containing instructions that, when executed by the processing circuitry, configure the device to:
    gather data feeds over a predefined detection time window to produce a detection dataset, wherein the detection dataset includes at least security events and a first set of bot-labels related to the activity of each of at least one virtual machine in the cloud-computing infrastructure during the detection time window;
    generate, using the detection dataset, a features vector for each virtual machine in the cloud-computing infrastructure, wherein the features vector is based on idiosyncratic (iSync) scores related to botnet activity;
    compute a reputation table for each security event type of the security events contained in the detection dataset, wherein each of the iSync scores is computed for each entity designated in the security events belonging to the security event type;

transmit each generated features vector to a supervised machine learning decision model to generate a label indicating if each of the plurality of virtual machines is a bot based on the respective features vector; and determine each virtual machine labeled as a bot as being part of a botnet.

13. The device of claim 12, wherein the device is further configured to:

compute the supervised machine learning decision model.

14. The device of claim 13, wherein the device is further configured to:

gather data feeds over a predefined learning time period to produce a leaning dataset, wherein the learning dataset includes at least security events and a second set of bot-labels related to the activity of each virtual machine in the cloud-computing infrastructure during the learning time period;

generate, using the learning data set, a features vector for each virtual machine in the cloud-computing infrastructure;

create, for each virtual machine, an instance using the respective generated features vector and a third set of bot-labels; and compute the supervised machine learning algorithm using the created at least one instance.

15. The device of claim 14, wherein the third set of bot-labels indicates bot activity occurring after issuance of the second set of bot-labels, wherein the first set of bot-labels indicate bot activity occurring after issuance of the third set of bot-labels.

16. The device of claim 12, wherein the device is further configured to:

compute a global-iSync value for each security event type based on the reputation table computed for the security event type; and generate a features vector for the virtual machine, wherein the generated features vector includes the computed global-iSync values.

17. The device of claim 16, wherein each iSync score is a probability that a security event entity is related to bot activity.

18. The device of claim 17, wherein each iSync score is a function of the first set of bot-labels.

19. The device of claim 17, wherein the device is further configured to:

sum all iSync scores computed for all security event entities that belong to the security event type and were accessed by the virtual machine.

20. The device of claim 14, wherein each of the first set of bot-labels, the second set of bot-labels, and the third set of bot-labels is received from a plurality of threat intelligence sources.

21. The device of claim 12, wherein the device is further configured to:

generate an alert upon determination that a virtual machine is part of a botnet.

* * * * *